Nov. 23, 1965     B. M. MOORE ETAL     3,218,861
CLINICAL THERMOMETER HAVING A REPLACEABLE, REPAIRABLE,
SHATTER-PROOF CAPILLARY TUBE
Filed Oct. 25, 1962
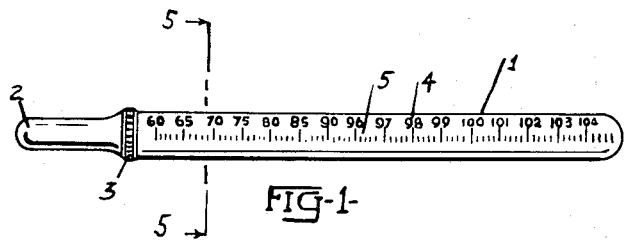
FIG-1-
FIG-2-
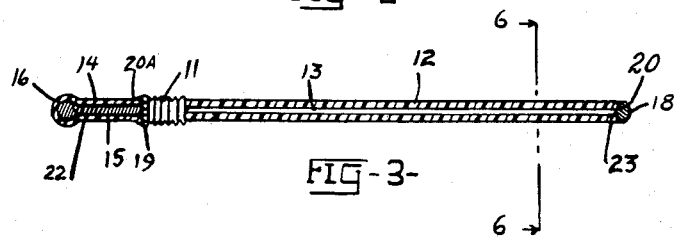
FIG-3-
FIG-4-
FIG-8-
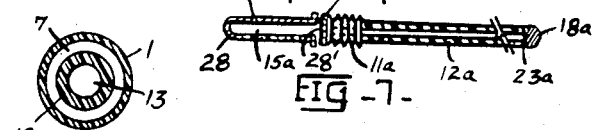
FIG-7-
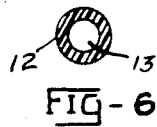
FIG-6-     FIG-5-
     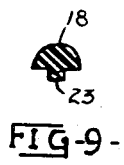
FIG-10-     FIG-9-
ROBERTSON M<sup>c</sup>DONALD &
BEN M. MOORE     INVENTORS
BY
Cushman, Darby & Cushman
Attys.

United States Patent Office 3,218,861
Patented Nov. 23, 1965

3,218,861
CLINICAL THERMOMETER HAVING A REPLACEABLE, REPAIRABLE, SHATTER-PROOF CAPILLARY TUBE
Ben M. Moore, 3610 Saratoga Drive, and Robertson McDonald, 4905 Franklin Road, both of Nashville, Tenn.
Filed Oct. 25, 1962, Ser. No. 233,118
2 Claims. (Cl. 73—371)

This invention relates to a clinical thermometer having a replaceable, repairable, shatter-proof capillary tube.

More particularly this invention pertains to a clinical thermometer having a shatter-proof replaceable unit and a removable outer casing carrying the degree graduations, both equipped with interconnecting threads for holding the capillary tube centered in the outer casing to form a unit with dead air space between the two parts.

It is a principal object of this invention to provide a clinical thermometer, insulated by a dead-air space from the ambient air thereby producing a more accurate reading of the body temperature without the error normally caused by lower room temperatures.

It is a further object of this invention to greatly reduce the cost of thermometers to hospitals as well as to the public, by supplying a removable and replaceable capillary tube and bulb unit, which represents only a fraction of the cost of the composite thermometer.

Another object of this invention is to provide a clinical thermometer wherein the two principal component parts are assembled or disassembled by the use of threads so that an unskilled person would be able to repair the thermometer in a matter of seconds, thus saving the principal investment and eliminating the inconvenience of obtaining an entirely new thermometer.

A further object of this invention is to provide a sealing plug at the end of the capillary tube opposite the bulb for repairing the removable unit should there be a separation of the mercury in the capillary tube (which so often happens in conventional clinical thermometers), since usually the mercury cannot be reunited and therefore the thermometer becomes worthless for further use; thus this invention makes provision for removal of said sealing plug and refilling with mercury when necessary. (There is often found in constricted portion of the capillary bore of conventional clinical thermometers a burr left during fabrication that prevents the mercury from receding after use. By removing the sealing plug, removing said burr and replacing the sealing plug, the thermometer, as disclosed by this invention, is again ready for use at greatly reduced cost.)

Another object of this invention is to provide a detachable mercury bulb of plastic or non-fragile material impregnated with good heat-conducting metallic particles or flakes to reduce the time required to obtain a temperature reading.

It is another object of this invention to provide a mercury bulb composed entirely of corrosion-resistant metal and detachable from the capillary stem for repair, and having suitable means for attaching to a collar forming an integral part of said capillary tube.

Another object of this invention is to provide such a thermometer unit with a collar having a high-friction knurled surface to assist in assembling or disassembling.

Still another object of this invention is to provide long-life non-fragile clinical thermometer that may be repaired with a minimum of time or expense, the user to carry an extra capillary tube for immediate replacement should the mercury column become separated.

There are other objects and advantages of this invention that will become apparent as the following detailed description thereof proceeds.

FIGURE 1 of the drawing is a plan view of a preferred embodiment of the invention showing the graduations for reading temperatures.

FIGURE 2 is a plan view, in axial section, of the outer casing.

FIGURE 3 is a plan view, in partial axial section, of the replaceable clinical thermometer unit proper.

FIGURE 4 is a view similar to FIGURE 3, of a modified replaceable unit.

FIGURE 5 is an enlarged end view of the showing in FIGURE 1, in section taken on the line 5—5 of said latter figure.

FIGURE 6 is an enlarged view of the showing of FIGURE 3, in section taken on the line 6—6 of latter figure.

FIGURE 7 is an exploded axial section view similar to FIGURE 4 but showing a modified form of the attachable bulb.

FIGURE 8 is an axial sectional view of a modified form of metallic bulb.

FIGURE 9 is an axial sectional view, enlarged, of one of the plastic sealing plugs.

FIGURE 10 is an axial sectional view of a modified form of plug.

With reference now to the drawings in detail, FIGURE 1 shows an assembled view. Numeral 1 designates the outer casing formed of transparent plastic material; numeral 2, the mercury-containing bulb; and numeral 3, the threaded joint at the point of assembly. Numerals 4 and 5 designate the temperature graduations in degrees and fractions thereof. Numeral 7 (FIGURE 5) denotes the air space between the component parts.

FIGURE 2 is a plan view in axial section of the outer casing. Numeral 8 (FIGURE 2) denotes the threads on the interior of the outer casing to receive and secure the threads 11 (FIGURE 3) of the inner capillary tube 12 when assembling or changing mercury tubes, and numeral 7 denotes the air space between the inner and outer elements.

FIGURE 3 is a plan view in partial axial section of the replaceable capillary tube with its component parts. Numeral 13 denotes the bore of the capillary tube wherein the mercury travels in response to the rise and fall of its temperature. Numeral 14 denotes the mercury bulb. Numeral 15 denotes the interior of the mercury bulb, while 16 denotes the spherical end of a rectal bulb. Numeral 18 denotes the plastic cap, removable when repairing or refilling the capillary tube with mercury. Numeral 19 is a knurled collar used as an aid to the assembling of or disassembling of the component parts of the thermometer, the knurled exterior of the said collar preventing slippage by providing better friction for connecting the two component parts together. Numeral 20A denotes a construction for stabilizing the mercury when reading temperatures after using. Numeral 20 denotes a flat surface at the extreme end of the capillary tube, affording a better seat for the plastic sealing cap 18. Numeral 23 denotes a plug-forming extension and an integral part of sealer cap numeral 18 for projection into capillary tube bore to perfect a better sealing thereof. Numeral 22 denotes the mercury contained in the mercury bulb.

In FIGURE 4, numeral 12' denotes a modification of the FIGURE 3 showing a replaceable capillary tube with a mercury bulb of the oral type. Numeral 11' denotes the threads for assembly with the outer casing while numeral 19' denotes the multiple-purpose collar used as a stop, a hand grip for assembly and an area of attaching the mercury bulb 14'. Numeral 22' denotes mercury contained in the mercury bulb of oral type.

FIGURE 5 is an enlarged end view of the showing of FIGURE 1, on section line 5—5. Numeral 1 denotes the wall of the outer casing, and numeral 7 denotes the air space, of insulative value, between it and the capillary tube 12. Numeral 13 denotes the bore for the travel of the mercury back and forth in the capillary tube.

FIGURE 7 is an exploded axial sectional view of a modified form of the replaceable bulb and tube unit. Capillary tube 12a has a knurled collar 16a; mercury bulb 14a is constructed of a non-shatter plastic material impregnated with metal particles (such as aluminum) for decreasing the time required to take temperatures. Numeral 28 denotes the mercury bulb produced as a separate unit for attachment at its flanged end to collar 16a with an appropriate adhesive 28'.

In FIGURE 8, numeral 29 denotes a metallic mercury bulb suitable for attachment by its flange 30 to a collar-like part 16a in FIGURE 7. The metallic bulb 29 is a good conductor of heat (formed for example of Invar and platinum-plated to prevent amalgamating with the mercury).

In FIGURE 9, numeral 18 denotes a plastic cap with a projection 23 for insertion into the capillary tube bore to obtain an efficient seal and may be effected through the use of an adhesive such as epoxy resin or by the use of threads (see FIGURE 10) by screwing into like threads in the bore of the capillary tube.

What is claimed is:

1. A clinical thermometer unit comprising a capillary tube formed of a relatively non-fragile transparent plastic material and a hollow bulb fixed to one end of said tube and adapted to hold mercury therein, said bulb being formed of metal so as to have a higher thermal conductivity than the material of said tube for providing quicker readings and the inner surface of said bulb being platinum-plated so that said bulb will not amalgamate with the mercury held in said bulb.

2. A clinical thermometer having a replaceable, repairable, shatter-proof capillary tube comprising in combination: a capillary tube formed of a relative non-fragile transparent plastic material; a hollow bulb fixed to one end of said tube and adapted to hold a thermally responsive expansible liquid therein; said bulb having a higher thermal conductivity than the material of said tube in order to provide more rapid temperature indications; a removable closure element sealing the other end of said tube whereby said closure can be removed and said capillary tube can be refilled with said thermally responsive liquid; and a protective sheath of transparent material removable receiving said capillary tube in spaced relation therewith so as to not only protect said capillary tube, but also provide a dead air space therebetween to insulate said capillary tube from the ambient air and thereby increase the accuracy and speed of temperature indication by said thermometer, wherein the thermally responsive, expansible liquid is mercury and the bulb is formed of metal, and the inner surface thereof is platinum-plated so that the metal of said bulb will not amalgamate with the mercury held therein.

References Cited by the Examiner

UNITED STATES PATENTS

| | | | |
|---|---|---|---|
| 1,348,749 | 8/1920 | Schneider | 73—374 |
| 1,811,190 | 6/1931 | Tate | 73—371 |
| 2,267,556 | 12/1941 | Eisele | 73—371 |
| 2,677,965 | 5/1954 | Saffir | 73—374 |
| 2,712,237 | 7/1955 | Margolis | 73—371 |
| 2,795,140 | 6/1957 | Loeb | 73—371 |

FOREIGN PATENTS

| | | |
|---|---|---|
| 10,816 | 8/1886 | Great Britain. |
| 253,988 | 12/1948 | Switzerland. |

ISAAC LISANN, *Primary Examiner.*